UNITED STATES PATENT OFFICE.

PIETER ANTON FREDERIK APPELBOOM, OF ROTTERDAM, NETHERLANDS, ASSIGNOR OF ONE-HALF TO CORNELIS WILLEM HENDRIK VAN DAM, OF ROTTERDAM, NETHERLANDS.

PRESERVATION OF MEAT.

1,006,175.  Specification of Letters Patent.  Patented Oct. 17, 1911.

No Drawing.  Application filed July 9, 1906.  Serial No. 325,316.

*To all whom it may concern:*

Be it known that I, PIETER ANTON FREDERIK APPELBOOM, a subject of the Queen of the Netherlands, and residing at Rotterdam, Netherlands, have invented certain new and useful Improvements in the Preservation of Meat, of which the following is a specification.

This invention relates to the preservation of bacon or raw meat and has for its object to provide a process which will not remove from the bacon or raw meat its natural flavor and appearance and further will leave it in such a state that it can be kept in any climate for a considerable time.

This invention is particularly applicable to the preservation of bacon and for convenience it will be described in detail as applied to the preservation of such, but it is to be understood that it can equally well be applied to the preservation of raw meat.

Hitherto when only required to be kept a short time the bacon has been salted and highly smoked. When it has been necessary to preserve it for some considerable time it has been salted in barrels but with this method of preserving, it very soon gets a nasty flavor. Neither of these methods is suitable for tropical or semi-tropical climates.

According to this invention the bacon is preserved in tins, not in the manner that other meat is preserved in a boiled or baked state, but it is kept in a "raw" or uncooked state. Neither chemicals are added, nor a large quantity of salt.

Starting with "raw" or uncooked bacon, that is to say slightly salted or smoked as usually sold, it is placed in tins holding say three to five kilograms each and about twenty grams of water per kilogram of bacon are then added. The tin is then hermetically sealed and it is exposed to a temperature of preferably between 120° and 130° centigrade for a length of time depending on the quantity of bacon in each tin and whether it is very fat or very lean. The tin and its contents are then suddenly cooled by immersing the tin in running water. The bacon by this process is completely sterilized. The amount of water to be added to the bacon in the process just described is of the greatest importance. If too much water is added the bacon is boiled and if too little it is baked. I have found that the amount of water required is about twenty grams per kilogram of bacon as stated above; doubtless a little more or less would produce the desired result, but the above proportion has been found in practice to be correct. If added in this proportion the bacon is neither boiled nor baked but it remains for a considerable time in an uncooked state, but yet as fresh as when first put in the tin.

The time during which tins must be kept in the heating apparatus must be found by trial as it obviously depends on the various conditions such, for example, as the quantity of bacon in each tin, the size and shape of the tins, the number of tins and the size of the heating apparatus. With a particular arrangement of steam heater actually employed the time required has been found to be in several instances between twenty-five and thirty minutes for a tin holding ten pounds of bacon.

The apparatus for heating the tins is preferably a steam heater the pressure of the steam being at least equal to or greater than the pressure of the steam within the tins, thereby preventing them from exploding.

The last step in the process, that is to say the sudden cooling of the tin and its contents causes the bacon to return to its original solid and hard condition so that its appearance does not differ from that of the original uncooked article.

The bacon is treated preferably in large chunks, although, of course, it can be treated in slices.

What I claim as my invention and desire to secure by Letters Patent is:—

The method of preserving uncooked bacon, which consists in placing the bacon in a tin, adding approximately twenty grams of water per kilogram of bacon, hermetically sealing the tin, heating to a temperature of between 120 C. and 130 C. and for a time sufficient to sterilize the bacon without cooking, and suddenly cooling the contents of the tin.

In testimony whereof I have signed my name to this specification in the presence of two subscribing witnesses.

PIETER ANTON FREDERIK APPELBOOM.

Witnesses:
J. O. HAAB,
S. WEIRAND.